INVENTORS
ANDREW DASKALAKIS
RICHARD FRENKIEL
HARRY W. NYLUND
CHARLES E. PAUL
PHILIP T. PORTER
BY Reg M. Porter
ATTORNEY INVENTORS
ANDREW DASKALAKIS
RICHARD FRENKIEL
HARRY W. NYLUND
CHARLES E. PAUL
PHILIP T. PORTER 3,539,924

ZONED MOBILE RADIO TELEPHONE SYSTEM

Andrew Daskalakis, Lincroft, Richard H. Frenkiel, Manalapan Township, Harry W. Nylund, Murray Hill, Charles E. Paul, Deal, and Philip T. Porter, Colts Neck, N.J., assignors to Bell Telephone Laboratories, Incorporated, Murray Hill and Berkeley Heights, N.J., a corporation of New York Filed Oct. 12, 1967, Ser. No. 674,941

Int. Cl. H04b *1/00*

U.S. Cl. 325—51 12 Claims

ABSTRACT OF THE DISCLOSURE

A mobile radio telephone system for operation along a fixed route in which a plurality of channels are staggered in a plurality of zones to provide continuity of communications as the mobile unit moves from zone to zone. The mobile unit determines the zonal location and situation from zone boundary indications. Apparatus on the mobile, operating in response to these boundary indications, selects the radio channel for both calls originating from the mobile and from fixed stations.

BACKGROUND OF THE INVENTION

This invention relates to mobile radio telephone systems and more particularly to automatic zone and channel control of a mobile radio system extending over a long distance along a fixed transportation route such as a railroad, highway, ship or airline route.

Present mobile radio telephone systems, including those in private use as well as those provided by common carriers, operate on the basis of specific channel assignments in restricted geographical areas or zones with a given frequency being reused in separated zones. While a given mobile unit can be arranged for continuous operation in one zone, channel switching must be resorted to when the mobile leaves that zone and travels into an adjacent zone of different frequency assignment. Continuity of a given conversation is not possible during the period in which the zones and channels assigned therein are being changed. This arrangement is obviously unsatisfactory for providing telephone service on long distance public conveyances, but likewise obvious, is the waste of frequency assignment if a given frequency channel were assigned to extend along an entire long distance route. Furthermore, even if the zone system of channel frequency assignment is retained in some modified form, one problem to which the present invention is directed arises from the lack of knowledge of the user of the mobile station or the base radio station or the telephone central office as to where, in terms of zones, the mobile unit is located.

SUMMARY OF THE INVENTION

In accordance with the present invention multiple channels of different frequency are assigned in successive multiple zones according to a uniquely staggered pattern such that at least one, and usually more than one channel frequency, is duplicated in at least one adjacent zone traveling along the route in each direction. Zone markers and associated equipment on the mobile unit automatically determine which direction the mobile is moving and which channel or channels of those available in the current zone will allow a continuous conversation from that zone into at least one other adjacent zone for the particular direction traveled. Since this information is available only to the mobile unit, a feature of the invention resides in arrangements made in order that the mobile unit determines the channel to be used not only for a call originating with the mobile unit, but also for a call originating from a fixed station while at the same time leaving all other channels available for other mobile units. In accordance with this feature, the base station is caused to transmit an idle tone on every unused channel in every zone and the mobile unit is allowed to select from these idle channels the one appropriate for its current location on which to originate a call. Similarly, when a call originates from the base station the mobile unit is signaled on every unused channel in every zone and the mobile selects the one appropriate for its location on which to respond.

Since the fixed station network cannot determine in advance on which channel or from which zone the mobile will originate or respond, a further feature of the invention resides in a particular interconnection linking a plurality of fixed station transmitters and receivers in different adjacent zones by which an exclusive communications path is established through the most appropriate fixed station unit dependent only upon which fixed unit receives the best signal from the mobile. When the mobile moves to an adjacent zone, continuity of the communications path is maintained by automatically switching to adjacent zone transmitter based on the best received signal comparison from the various zones.

DETAILED DESCRIPTION

Figure 1:
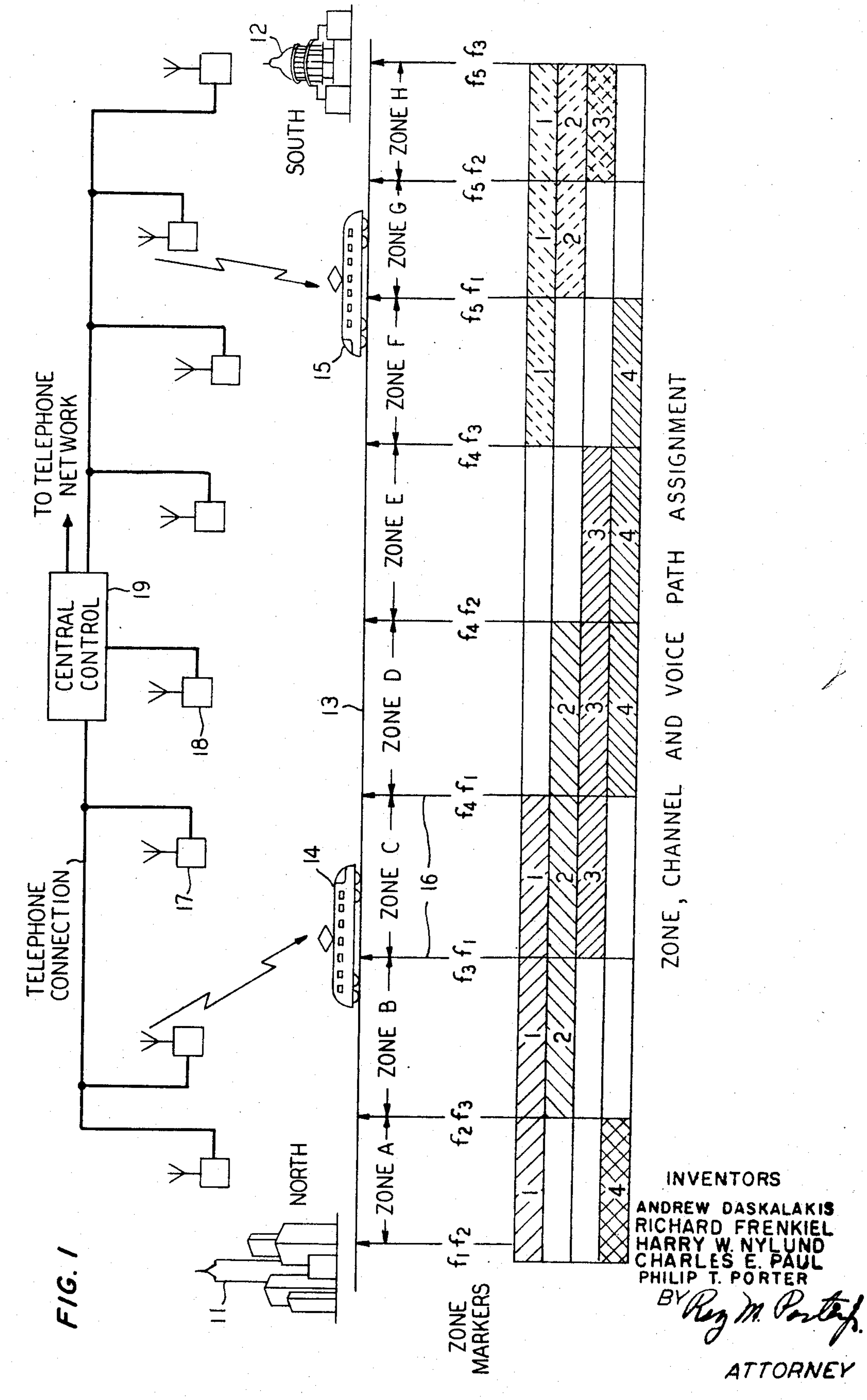
FIG. 1 is a pictorial illustration of an extended mobile radio telephone system together with a staggered channel arrangement in accordance with the invention.

Referring more particularly to FIG. 1, a pictorial illustration of a long distance mobile radio telephone system is shown together with typical zones, zone markers, and channel assignments. Illustrated are a north city 11 and a south city 12 interconnected by a transportation route 13 which may be a railroad, a bus route, a turnpike, airline or even a ship route. For convenience, it will be assumed hereinafter that route 13 is a railroad and includes at least oppositely traveling trains 14 and 15. The length of route 13 is divided into a plurality of zones, the number of and the length of each being flexible to accommodate local conditions such as station stops, tunnels, urban areas, expected use loads, and the like. For convenience of explanation, eight zones A through H are shown using four channels of different frequency assignment. It should, however, be understood that a practical system usually, but not necessarily, requires a somewhat larger number of both zones and channels. Channels 1 through 4 are arranged in the zones A through H according to what will be referred to herein as a "staggered" pattern. While there is a great flexibility in the particular arrangement, a staggered pattern is characterized by at least some of the channels extending through two, three or more adjacent zones, such as channel 1 in zones A, B and C, separated by an appropriate number of unused zones, such as channel 1 in zones D and E, followed by reuse of this channel in other zones, such as channel 1 in zones F, G and H. In addition, other channels in used and unused zones are offset or staggered from each other to obtain different channel coverage in each zone, overlapping, however, in adjacent zones. Thus channel 2 which is used in zones B, C and D overlaps channel 1 in zones B and C, overlaps channel 3 in zones C and D and overlaps channel 4 in zone D. Similarly channel 3 which is used in zones C, D and E overlaps channel 2 in zones C and D, and overlaps channel 4 in zones D and E. The number and sequence of either used or unused zones, or the number of zones overlapped, need not be the same for all channels or in all zones and may be chosen to accommodate different anticipated use loads along different portions of route 13. Single zone channels may appropriately be used at terminals or stations such as channel 4 in zone A or channel 3 in zone H. On the other hand, these single channel zones may each be considered as the first zone of a channel which extends north or south beyond the specific cities 11 and 12. If a zone does in fact constitute "the end of the line," it is preferable that the ending zone marker be placed a short distance into the zone while channels in the ending zone be allowed to handle communications within the terminal over this short distance as illustrated in connection with city 11.

A given channel in contiguous zones is conveniently referred to as a "voice path." Thus the shading of the zones of FIG. 1 indicates that eight, partially overlapping voice paths are obtained by the arrangement described, two serving each of zones A, B, E, F and G and three serving each of zones C, D and H.

The boundary between each zone and at the ends is marked by zone markers 16, the specific nature of which will be considered in more detail hereinafter, each of which provides a unique indication to trains 14 and 15 at each boundary of the zone being entered for a particular direction of travel. In the preferred embodiment illustrated, each zone marker comprises suitably generated signals of two different frequencies, selected from the group $f_1$ through $f_5$, received sequentially in an order that depends upon the direction of travel. Thus the signal $f_1$ followed by $f_4$ comprises a zone code combination that uniquely indicates that zone C is being entered in the course of northbound travel, while $f_4$ followed by $f_1$ comprises another zone code combination and indicates that zone D is being entered in southbound travel.

In accordance with the present invention, a communication initiated in any given zone is assigned to a channel which is not only available in that zone but which extends into at least the following zone for a given direction of travel. Even though a channel exists in a given zone it will be skipped if it does not also extend into the next zone. Consider for example train 14, southbound in zone C. Channels 1, 2 and 3 are each available in zone C but only channels 2 and 3 extend into zone D. Channel 1 will be skipped. On the other hand if train 14 had been traveling northbound in zone C, a communication started in zone C would have been assigned either channels 1 or 2 since channel 3 does not extend into zone B and will be skipped. This channel information is available only to train 14 since its location is unknown to base stations such as 17 or 18 or to anything in the connected telephone network.

Each zone has associated with it a fixed station as symbolized by stations 17 and 18 in zones C and D, for example. Each fixed station includes a transmitter and receiver combination for each channel available in that zone. For example, fixed station 17 includes transmitters and receivers operating in channels 1, 2 and 3. The several fixed stations of one route portion are connected by a telephone connection to a central control station 19 to be described in more detail hereinafter, which in turn is connected to the fixed telephone network.

Figure 2:
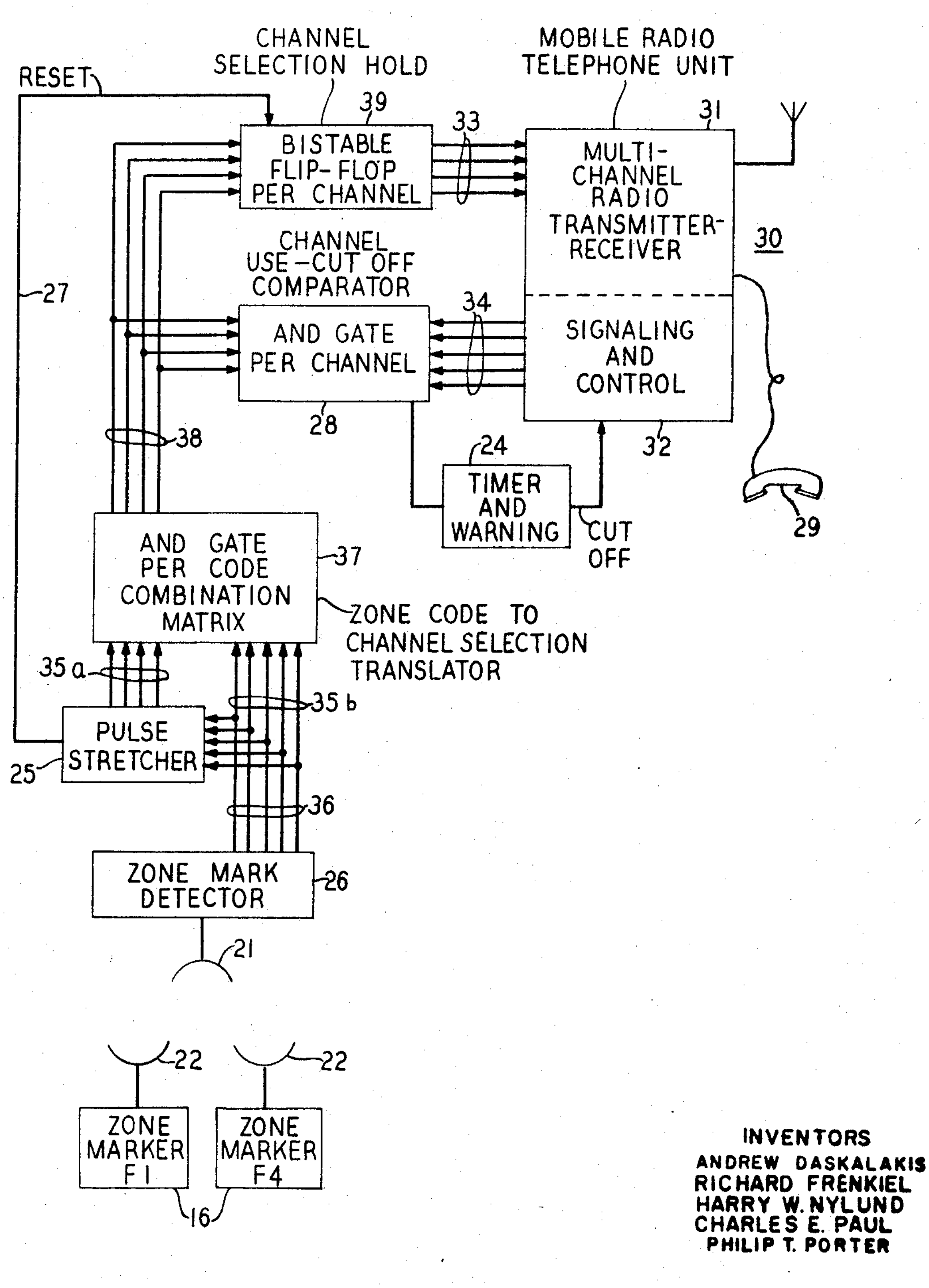
FIG. 2 is a block diagram schematic of equipment associated with any one mobile unit.

FIG. 2 illustrates in block diagram form the equipment comprising any one mobile unit, such as that on train 14, adapted in accordance with the invention to utilize the staggered channel arrangement described in FIG. 1. In order to avoid unnecessary description of known mobile radio telephone equipments and techniques, which description would only obscure the true nature of the present invention, it is convenient to view the equipment comprising the mobile unit shown in FIG. 2 as a modification to or adaptation of presently existing mobile radio equipment as described for example in an article "The MJ Mobile Radio Telephone System" in the Bell Laboratories Record, December 1964 at page 383; or an article "An Improved Mobile Dial Telephone System" in the I.E.E.E. Transactions on Vehicular Communications, vol. VC–12, page 32, September 1963; or in U.S. Patent 3,118,018 granted Jan. 14, 1964 to W. A. Cornell et al.; or in the copending application of R. A. Chaney, Ser. No. 368,218 filed May 18, 1964; or U.S. Patent 2,599,097 granted June 3, 1952 to F. S. Entz et al.; or U.S. Patent 2,594,087 granted Apr. 22, 1952 to R. O. Soffel; or U.S. Patent 2,657,266 granted Oct. 27, 1953 to D. H. Hoth et al.

Thus in FIG. 2 box 30 represents equipment typical of that now being used commercially to supply mobile radio telephone service. The equipment within box 30 includes a multichannel radio transmitter-receiver 31 of conventional design and a signaling and control circuit as represented by sub-box 32. As described in the abovementioned publications and patents, particularly that of Patent 2,657,266 to Hoth et al., equipment 32 includes circuits capable of searching the several channels on which the multichannel transmitter-receiver unit 31 operates until the one channel is found on which an idle tone modulation is being transmitted by a fixed station transmitter of the network. The mobile unit then locks onto a channel marked with the idle tone and the next call in either direction is completed over this channel. If the channel should cease to be idle, the idle tone is removed by the fixed station and the mobile automatically abandons that channel and searches for the new channel marked with idle tone. Control circuit 32 also includes equipment particularly described in the above noted Patent 2,599,097 to Entz et al. for transmitting a coded modulation which identifies the mobile and indicates to the fixed station that it desires to make a call and includes similar equipment for receiving a coded modulation from a base station indicating that the mobile is being called. On-hook, off-hook and dial pulse information are also exchanged by interrupted tone modulations.

The conventional mobile radio equipment thus described is modified in order to accommodate the present invention by circuits which translate information from zone markers 16 into a predetermined combination of channel selections of those to be searched and those which are to be skipped for call initiated in a given zone and for suitably terminating a call in progress when the channel in use is no longer appropriate in a following zone. Thus mobile radio equipment 30 is modified to provide for each channel an external lead 33 on which a grounded condition is required for the corresponding channel to be searched and an open circuit for the corresponding channel to be skipped. Further, means comprising leads 34 are provided for deriving an indication of whether a given channel is in use at a particular time.

In accordance with a preferred embodiment, zone markers 16 and zone marker detector 26 may be of the form disclosed in Patent 2,828,480 granted Mar. 25, 1958 to L. R. Golladay and entitled "Train Identification System." The arrangement there disclosed is a magnetic induction system in which the pickups 22 and 21 of the fixed and moving circuits respectively resonate together at predetermined frequency as they pass each other and produce a pulse output on a given one of leads such as 36 representative of a given resonant frequency. The present invention contemplates that at least two of these fixed circuits shall be located a few feet apart along track 13 at each zone boundary to produce pulses spaced apart in time as trains 14 or 15 move across them. It should however be understood that other arrangements, such as radio beacons, can be used insofar as the present invention is concerned.

Further equipment associated with each mobile unit includes suitably designed circuits for translating the pulse information appearing on leads 36 into a predetermined combination of open and grounded states on leads 33. While numerous equivalent circuits will occur to those skilled in the art, a preferred embodiment of the inven- Carrier from this other mobile received on any one of the channel 3 receivers has caused selector 61 to remove idle tone from all channel 3 transmitters in the voice path in zones C, D and E. Other carrier operated selectors of every unused voice path, including selector 55 of channel 2 will, however, be applying idle tone to all transmitters of all channels, in all other zones.

Signaling and control circuit 32 of the mobile unit 30 searches channels 2 and 3, determines the idle tone in channel 2 and causes transmitter 31 to radiate carrier in channel 2. This carrier is received by each of the fixed station channel 2 receivers 40, 42 and 44. Carrier operated selector 55 compares the received carriers and selects the best for connection to the telephone network. In the case of normal radio transmission conditions the selected receiver would probably be receiver 42 in zone C. Dial tone is subsequently received from the telephone network which is applied by selector 55 to transmitter 42. The call is completed by mobile unit 30 in its usual manner.

When train 14 moves from zone C into zone D it passes zone markers $f_4$, $f_1$. No change in the circuits presently in use in the mobile unit is required since channel 2 continues to be available in zone D. However, when the train passes from zone D into zone E channel marker $f_4$, $f_2$ as interpreted in zone code translator 37 indicates that channel 2 is no longer available in zone E. A pulse as hereinbefore described appears on the lead 38 corresponding to channel 2 which is applied to one input of the channel 2 AND gates in channel-use-cutoff comparator 28. This information that channel 2 is not now preferred is compared with information on the channel 2 lead 34 indicating that channel 2 is in use. Coincidence of this information in the AND gate activates timer and waring unit 24 which initiates a warning, either visual, audible or both, indicating to the mobile user to discontinue his conversation. After a suitable predetermined interval, such as one minute, the timer portion of 24 cuts off channel 2. When the handset 29 is returned to its switch hook, mobile unit 30 is returned to standby condition when released.

If a new call is now placed in zone E, information which was stored in channel-selection-hold 39 when marker $f_4$, $f_2$ was passed, will make channel 4 only available and the new call will repeat the procedure hereinbefore described.

As train 14 moves from zone to zone using a given voice path, the carrier operated selector for the voice path in use in central control 19 automatically follows the progress from zone to zone by determining which receiver is receiving the best signal and substantially instantaneously connecting the telephone network to that receiver and the corresponding transmitter.

On a call originating from the telephone network the sequence of operation is similar. Consider for example a call directed to train 15 which, although unknown to the fixed stations, is in zone G traveling north. At the time train 15 passed across the boundary between zone H and entered zone G reception of the zone marker $f_2$ followed by $f_5$ set up in channel-selection-hold 39 an indication that only channel 1 was available for communication in zone G as well as in the following zone F, and that all other channels were to be skipped. Provided channel 1 is not already in use, mobile unit 30 will have searched out and locked onto the idle tone transmitted in channel 1 by all transmitters in all zones even though this fact is unknown to the fixed stations. The telephone network is initially connected to selective signaling 59 which tone modulates every fixed station transmitter in every unused voice path regardless of channel and in all zones, according to assigned code designation of train 15. This identification is received by the mobile equipment on train 15 on channel 1 only and the mobile responds by operating its transmitter in channel 1. Carrier is received by the channel 1 receivers 61, 62 and 63 in zones F, G and H and carrier operated selector 64 picks the best signal, presumably that from receiver 62 in zone G; disconnects idle tone 58 and selective signaling 59, turns off the transmitter and receivers 61 and 63 in zones F and H, and connects the transmitter and receiver 62 in zone G to the telephone network. The conversation can continue throughout the remainder of zone G, throughout all of zone F until the cutoff sequence is started by the zone marker $f_3$, $f_4$ when zone E is entered.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A long route mobile radio telephone system comprising a mobile multichannel receiver-transmitter unit, a plurality of fixed receiver-transmitter units distributed in zones along said route, said fixed units having operating frequencies in a staggered channel arrangement such that the same channel frequency occurs in some adjacent zones but not in other adjacent zones, means responsive to an indication of the zone location of said mobile unit for causing said mobile receiver-transmitter to operate in a channel for which there is a corresponding fixed station channel in the current zone and also in a least the next zone in the direction of mobile movement, and fixed station means responsive to transmission received from said mobile for establishing an exclusive communications link between a telephone network and said mobile through that fixed receiver-transmitter unit having a channel frequency corresponding to that of said mobile.

2. The system according to claim 1 wherein said means responsive to an indication of zone location includes means at each boundary between said zones for generating as said mobile moves a sequence of at least two signals unique to that boundary and to the direction of movement, and means for translating said sequence into an indication of channels for which there is absent a corresponding fixed station in either said current zone or in said next zone.

3. The system according to claim 1 wherein said means for establishing an exclusive communications link includes means connecting a plurality of said fixed units having the same channel frequency in different adjacent zones and for establishing said link through the one unit receiving the best signal from said mobile.

4. The system according to claim 3 including means for transmitting an indication of an idle channel from every fixed unit in every channel in every zone except from said connected plurality including said one unit.

5. The system according to claim 3 including means for transmitting an indication that a given mobile is being called from every fixed unit in every channel in every zone except from said connected plurality including said one unit.

6. A long route mobile radio telephone system comprising a mobile multichannel receiver-transmitter unit, a plurality of fixed receiver-transmitter units distributed in zones along said route using the same channel frequencies in some adjacent zones but different channel frequencies in other adjacent zones, means for transmitting an indication that a given mobile is being called from a plurality of fixed units on a plurality of channel frequencies in a plurality of zones, and means responsive to an indication of the zone location of said mobile unit for causing said mobile receiver-transmitter to respond on one channel frequency for which there is a corresponding fixed station channel frequency in the current zone and also in at least the next zone in the direction of mobile movement.

7. The system according to claim 6 including fixed station means for interconnecting a plurality of said fixed units having the same channel frequency in different adtion comprises a multiplicity of AND gates 37 including one gate for each zone boundary for each direction of travel, i.e., one for each zone code combination such as $f_1f_4$, $f_4f_1$, $f_2f_3$, $f_3f_2$, et cetera.

The outputs of AND gates 37 are connected through isolating diodes into a matrix so that each gate produces a pulse on one or more of leads 38 corresponding to channels of to be skipped for a given zone code combination. This assembly will hereinafter be referred to by its appropriate functional description of "Zone Code to Channel Selection Translator." The input to each gate in translator 37 comprises a pulse on one of leads 35*a* corresponding to the first zone marker of a zone code combination and a second pulse on one of leads 35*b* corresponding to the second zone marker in that combination.

In order to achieve a time coincidence between these pulses at a given gate, in translator 37, the first received pulse on one of leads 36 is suitably delayed or stretched in pulse stretcher 25 for a period long enough to cover the usual expected time interval between the first and second zone markers of a code combination. If the second pulse is not received in this period no action is taken by translator 37. This provides some discrimination against false indications.

The channel selection thus made by translator 37 is held for the duration of the time the mobile is in a given zone by a bank of bistable flip-flop multivibrators 39, having one multivibrator per channel connected one each to leads 33 such that in one state of each multivibrator a given lead 33 is open and therefore its channel is skipped. Each multivibrator remains in the one state until all are reset by a pulse on lead 27. This assembly will be referred to hereinafter by its appropriate functional description of "Channel Selection Hold" since the multivibrators hold an identification of the channels to be skipped after being driven into said one state by a pulse on one of leads 38. The reset pulse on lead 27 necessary for preparing channel selection hold 39 for a new channel combination is obtained from the leading edge of the first received pulse from stretcher 25.

Finally, each mobile unit includes a channel-use-cutoff comparator unit 28 which includes a further AND gate for each channel for determining coincidence between a channel to be skipped as indicated on leads 38 and that channel's current use as indicated on leads 34. When such coincidence occurs timer unit 24 is activated to give a warning to the mobile telephone user, and after a suitable timed delay, to cut off transmitter-receiver 31 on that channel.

The base station equipment may similarly be viewed as a modification of existing mobile radio telephone equipment and an effort will be made only to describe in detail those portions which bear on the present invention. Thus details of the specific interconnection through a given telephone central office to the telephone network, the generation and transmission therebetween of selective signaling information in form of the modulated tones mentioned hereinbefore, and the generation and transmission therebetween of other supervisory information are fully described in the above-mentioned references and need not be considered in detail.

Important to the principles of the present invention, however, is the interconnection through central control 19 of FIG. 1 of the several transmitter-receiver combinations located in fixed stations, such as 17 and 18, in different zones and operating in different channels.

Figure 3:
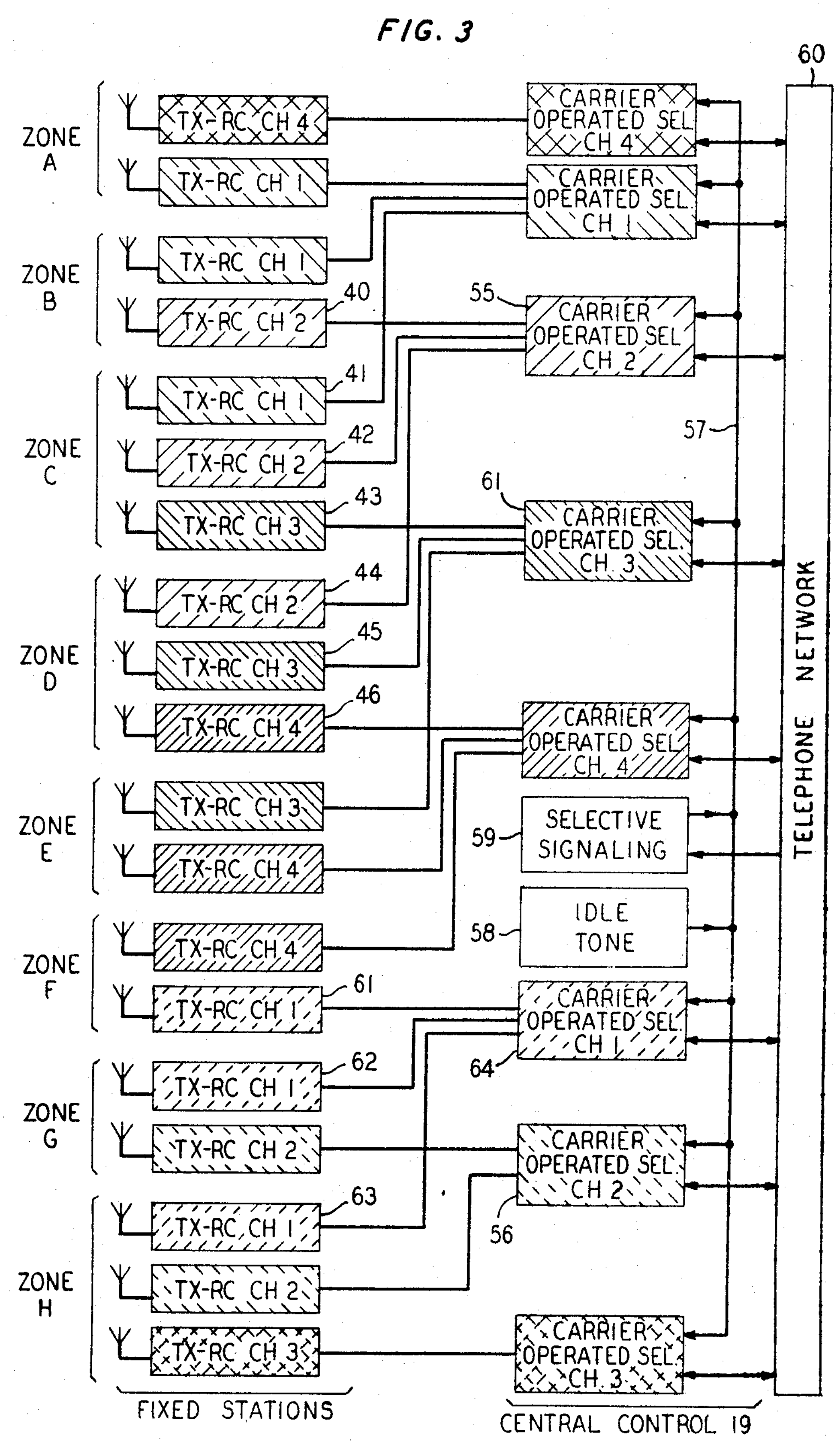
FIG. 3 is a block diagram showing a typical interconnection to a telephone network of fixed transmitters and receivers in each zone of FIG. 1.

Referring therefore to FIG. 3, recall that the apparatus in each zone includes a transmitter-receiver combination operating in each of the channels available in that zone. Thus base station 17 in zone C includes transmitter-receivers 41, 42 and 43 for channels 1, 2 and 3, respectively, while base station 18 includes transmitter-receivers 44, 45 and 46 for channels 2, 3 and 4, respectively. Other transmitter-receiver combinations are located in each zone following the channel assignment pattern of FIG. 1.

Interconnecting the transmitters-receivers comprising each "voice path" as defined above is a carrier operated selector, such as 55 associated with the voice path operating in channel 2 in zones B, C and D and interconnecting transmitter-receivers 40, 42 and 44. Carrier operated selectors and the associated transmitter-receiver for all other voice paths of FIG. 1 are shown in FIG. 2 and have been given shadings which correspond to the voice path shading of FIG. 1. While making up part of central control 19, it should be recognized that a given selector may be physically housed in any convenient base station and may be connected to the transmitters and receivers in other adjacent zones or voice paths by appropriate telephone connections. Note also that a second carrier operated selector 56 operating in channel 2 is provided for the second voice path using channel 2 in zones G and H. Also forming part of central control 19 and available to each selector, as by means of a bus 57, is a source of idle tone 58 as described above, and a source of selective signaling tones 59 activated from the telephone network 60.

Each carrier operated selector such as 55 or 56 is basically a multiple function switch, sensitive to the carrier signals received on any of the receivers in its voice path. Details of a simple carrier operated switch may be found in E. M. Staples Patent 2,589,158 granted Mar. 11, 1952, a much more sophisticated switch in R. O. Soffel Patent 2,594,087 granted Apr. 22, 1952, and repetition of these details here would merely serve to obscure the true invention. Other circuits using either relays or solid state techniques and suitably equivalent to the ones shown in these patents will readily occur to those skilled in the art. In whatever form the carrier operated switch is embodied, its functions may be described as follows:

In a standby condition when no carrier is received by any receiver, each selector applies idle and/or selective signaling tones from bus 57 to each transmitter in that selector's voice path. When a carrier from any mobile unit is received at any of the receivers in a given selector's voice path, the selector chooses the receiver having the best signal, connects that receiver together with its transmitter to telephone network 60, disconnects bus 57, and turns off the other receivers and transmitters of that voice path.

The novel cooperation in accordance with the invention of the component parts thus far described may best be understood by tracing the sequence of a call originated by the mobile in a specific zonal circumstance. Assume therefore that train 14, traveling south, is entering zone C. As it enters the zone, zone marker frequencies $f_3$ followed by $f_1$ are received by zone mark detector 26. The signals are filtered and then detected to form pulses corresponding to each of the received frequencies. These pulses appear respectively on two of leads 36 and are applied to zone code translator 37, the first through stretcher 25 and the second directly. Zone code translator 37 converts the sequence of pulses into an indication that for southbound travel in zone C channels 2 and 3 exist in that zone and also in the subsequent zone D, and that channels 1 and 4 should be skipped. This indication appears on each of leads 38 corresponding to channels 1 and 4 in the form of a pulse. When applied to channel selection hold 39, each pulse is converted into an open circuit condition on leads 33 of channels 1 and 4 and this condition is held until reset by a pulse on lead 27 preceding a different indication from zone code translator 37 at a subsequent zone boundary.

The mobile is now ready to place a call on either channel 2 or 3 but has no information as to which of these channels is already in use. The fixed station equipment has no information as to the location of train 14 and therefore no information as to which channel the mobile intends to use. A particular feature of the present invention resides in the way this problem is solved. Turning for the moment to the equipment of the fixed stations, assume that channel 3 is already in use by another mobile.

jacent zones and for establishing an exclusive communications link through the one of said interconnected units receiving the best signal from said mobile.

8. The system according to claim 1 wherein said staggered channel arrangement is characterized in that the frequency comprising said same channel frequency in adjacent zones progresses from one channel frequency to another along said route.

9. The system according to claim 1 wherein said staggered channel arrangement is characterized in that the same channel frequency occurs in sets of adjacent zones with the sets overlapping each other but not duplicating each other in zones along said route.

10. The system according to claim 1 wherein said staggered channel arrangement is characterized by a first channel frequency that occurs in a first plurality of adjacent zones having the last zone thereof adjacent to at least one of said other zones in which said first frequency is absent, and further characterized by a second channel frequency that occurs in said one of said other zones and in some of the zones of said first plurality but that is absent in at least one zone of said first plurality.

11. A long route mobile radio telephone system comprising a mobile multichannel receiver-transmitter unit, a plurality of fixed receiver-transmitter units distributed in zones along said route, said fixed units including a first channel frequency in at least first and second adjacent zones but not in a third zone adjacent to said second, said fixed units including a second channel frequency in at least said second and third zones but not in said first, means responsive to the transit of said mobile from said first into said second zone for causing said mobile receiver-transmitter to operate in said second channel in said second and third zones rather than in said first, means responsive to the transit of said mobile from said third into said second zone for causing said mobile receiver-transmitter to operate in said first channel in said second and first zones rather than in said second channel, and fixed station means in said zones responsive to transmission received from said mobile for establishing an exclusive communications link between a telephone network and said mobile in the channel in which said mobile is caused to operate.

12. A mobile radio telephone system including at least one mobile multichannel transmitter-receiver radio unit responsive to at least one of a plurality of multichannel stationary transmitter-receiver radio units spaced apart along a route which route is divided into zones, said mobile unit including means responsive to signals that identify the zones from which and to which the mobile radio unit is traveling for selecting an idle working channel at a given frequency for said mobile in the current zone, said system including further means for seizing and reserving for exclusive use by said one mobile unit a channel at said given frequency in a zone contiguous to said current zone.

References Cited

UNITED STATES PATENTS

| | | | |
|---|---|---|---|
| 2,421,017 | 5/1947 | Deloraine et al. | 325—3 XR |
| 2,509,218 | 5/1950 | Deloraine | 325—3 |
| 2,745,953 | 5/1956 | Young | 325—53 |
| 2,877,343 | 3/1959 | Mitchell | 325—53 |
| 2,941,201 | 6/1960 | Babcock | 325—53 XR |

RICHARD MURRAY, Primary Examiner

A. J. MAYER, Assistant Examiner

U.S. Cl. X.R.

325—3, 4, 15, 53; 340—47